United States Patent [19]

Barkan

[11] Patent Number: 5,864,667
[45] Date of Patent: Jan. 26, 1999

[54] METHOD FOR SAFE COMMUNICATIONS

[75] Inventor: Mordhay Barkan, Petah Tikva, Israel

[73] Assignee: Diversinet Corp., Toronto, Canada

[21] Appl. No.: 916,438

[22] Filed: Aug. 22, 1997

Related U.S. Application Data

[63] Continuation of Ser. No. 626,571, Apr. 2, 1996, abandoned.

[30] Foreign Application Priority Data

Apr. 5, 1995 [IL] Israel ........................................ 113259

[51] Int. Cl.$^6$ ................................. H04L 9/00; H04L 9/30
[52] U.S. Cl. ............... 395/187.01; 395/186; 395/200.54; 395/200.59; 380/4; 380/23; 380/30
[58] Field of Search ............................... 395/187.01, 186, 395/188.01, 200.42, 200.46, 200.47, 200.49, 200.54, 200.55, 200.57, 200.59, 200.6; 380/3, 4, 23, 25, 30, 44; 340/825.31, 825.32

[56] References Cited

U.S. PATENT DOCUMENTS

| | | | |
|---|---|---|---|
| 4,218,582 | 8/1980 | Hellman et al. ........................... | 380/30 |
| 4,405,829 | 9/1983 | Rivest et al. ............................... | 380/30 |
| 4,799,258 | 1/1989 | Davies ........................................ | 380/21 |
| 4,868,877 | 9/1989 | Fischer ....................................... | 380/25 |
| 4,888,800 | 12/1989 | Marshall et al. ........................... | 380/21 |
| 5,261,002 | 11/1993 | Perlman et al. ............................ | 380/30 |
| 5,276,737 | 1/1994 | Micali ......................................... | 380/30 |
| 5,434,918 | 7/1995 | Kung et al. ................................. | 380/25 |
| 5,442,342 | 8/1995 | Kung ................................. | 340/825.34 |
| 5,475,758 | 12/1995 | Kikuchi ...................................... | 380/25 |
| 5,481,610 | 1/1996 | Doiron et al. ............................. | 380/21 |
| 5,491,752 | 2/1996 | Kaufman et al. .......................... | 380/30 |
| 5,495,533 | 2/1996 | Linehan et al. ............................ | 380/21 |
| 5,535,276 | 7/1996 | Ganesan .................................... | 380/25 |
| 5,557,678 | 9/1996 | Ganesan .................................... | 380/21 |
| 5,577,120 | 11/1996 | Penzias ...................................... | 380/23 |
| 5,588,059 | 12/1996 | Chandos et al. ........................... | 380/21 |

FOREIGN PATENT DOCUMENTS 0410037  5/1991  European Pat. Off. .

OTHER PUBLICATIONS

Davis, D. & Swick, R; "Network security via private–key certificates"; USENIX association; 1992; pp. 239–242.

Tardo, Joseph J. & Alagappan, Kannan; "SPX: Global authentication using public key certificates"; IEEE pp; 1991; pp. 232–244.

Le et al; "A public key extension to the common cryptographic architecture"; IBM Systems Journal, v.32n3; 1993; pp. 461–485.

Primary Examiner—Dieu-Minh Le
Attorney, Agent, or Firm—Dinesh Agarwal

[57] ABSTRACT

Disclosed is a method for safe distribution of encryption keys including a known public and secret private keys in establishing a secure link between computer users resided at separate location whom have no previous secure communications. The secure communication link occasionally and anonymously interrogates the key distribution center for the certificate pertaining to the computer users in ensuring the validity and integrity of the information stored in the center which is not tampered by any unauthorized persons. The interactively interrogating of the key distribution center is conducted via a trusted and verified certificate decision making process which encompasses the acknowledging to user who receives a valid certificate, accepting an encrypted message, key distributed center's answer to the correct up-to-date certificate, decrypting the key distributed answer via the public key, and matching the answer's identification. As the result of the muli-steps process exchanged among users via key distributed center and other secure devices, the secure link can be established between the computer users in allowing data to be transferred from one computer location to another computer location in providing a very high reliability and confidentiality of users' data connectivity.

7 Claims, 4 Drawing Sheets

METHOD FOR SAFE COMMUNICATIONS

CROSS-REFERENCES TO RELATED APPLICATIONS

This is a continuation to my prior nonprovisional application, application Ser. No. 08/626,571 filed Apr. 2, 1996 with the US PTO, for APPARATUS AND METHOD FOR SAFE COMMUNICATIONS, now abandoned. This is a file wrapper continuation pursuant to 37 C.F.R. 1.62. The application Ser. No. 08/626,571 is to be abandoned upon granting the benefit of filing date of the parent to the present application.

BACKGROUND OF THE INVENTION

This invention relates to safe public communication systems, and more particularly to such systems which include means for secure distribution of the encryption key and the communication parameters.

Heretofore, various devices and methods were devised for secure voice and/or data communication for public use, using analog or digital encryption means. Common to the various encryption methods is the use of an encryption key, which provides a higher level of protection together with flexibility and standardization. Public key encryption, by using separate encryption and decryption keys, offers better protection for encrypted messages. A public key cryptographic system and method was disclosed in Merkle-Hellman U.S. Pat. No. 4,218,582; the RSA (Rivest- Shamir-Adleman) encryption system and method was disclosed in U.S. Pat. No. 4,405,829.

With the proliferation of encryption machines in commerce and for private use, a situation arises wherein a user desires to establish a secure communication link with another user having an encryption machine. The user poses a problem: How to exchange the encryption keys in a secure way, to establish the secure link. If the key is compromised, then the whole communication is compromised, and the encryption is useless. This is a vicious circle, since a secure link is required to transmit the key to begin with; but, since the other party doesn't have yet the key, the secure link can't be used to transmit the key itself.

Furthermore, data communication systems face the dangers of eavesdropping and impersonation, with the associated risks of the key being intercepted or a false key being transmitted by an impersonator. Accordingly, means are required for secure key distribution, this being an essential requirement for the widespread use of encryption machines, that is for establishing a secure link between parties which had no previous secure communications therebetween.

The security of the encryption process depends on the security of the encryption key, which depends on the security of the key distribution means; therefore, special means are required to provide a higher level of protection for the key distribution means itself.

A directory of public keys could be used, but a fixed list cannot cope with the fast changing situation in this area, with new users joining continuously, users changing address and users changing keys for better protection.

Various attempts at solving the key dissemination problem were devised, for example PGP maintains a public server containing a list of public keys. PGP server accepts and maintains a file with a collection of identification packages (KeyID). Each identification package includes the name and details of a key holder, together with his/her public key, which are signed (authenticated) by a third party which encrypts the package with his/her private key.

Another party desiring to communicate with such a key holder searches for an identification package signed by someone known/ accepted by them, thus "ensuring" that is the true key, which truly belongs to the person as claimed; the third party is "known/accepted" in the sense that the caller believes that its encryption key pair are as claimed and are not compromised. Since any single third party may be unknown to the other party, said key holder submits a plurality of identification packages to the PGP server, each signed by a different third party; another party looking for a reliable encryption key has to desiring to communicate with search all the packages belonging to that key holder, until he finds one signed by a third party known to him.

Thus, the PGP server maintains a file with a collection of identification packages for a multitude of users, and with a plurality of packages for each user. Thus it may be difficult to keep this vast quantity of information to disseminate it to users.

Another key dissemination method is employed by VeriSign, which distributes digital "certificates" valid for a long time period, for example 5 years. A certificate includes the name and additional information for a user, together with the public key for that user and the expiry date of the certificate, all encrypted with the private key of the issuing authority. Another certificate is issued to that first issuing authority by a higher second authority, and so on. This is a hierarchical authorization structure, with a user bringing signatures from persons/entities at several levels, until a level high enough is reached which is also part of the hierarchy of the calling party.

A great effort is put into ensuring the identity of a user before issuing a certificate, and in keeping the certificates; however, a certificate once issued may be compromised during its long lifetime, in which case it is difficult to replace. The center has no control over the use of an issued certificate while the certificate is still valid, during the long period as set at issue time; only the "black list" at the center may give a warning to that effect, but that can only prevent communications. A reliable key has yet to be exchanged between the parties, which is difficult in this case.

RSA Data Security Inc. offers another system including a center which issues certificates, that is digital documents containing the name and details for a user, together with his/her public key and an expiration date, all encrypted with the private key of the center. The expiration date is a weak link for this system since, as the key approaches its expiry date, the chance of its being compromised increases, and more verification requests will be placed with the center.

If a key is compromised, it is practically impossible to remove it from the server; PGP and RSA only keep a second list (the black list) of disabled or canceled keys, but this is a cumbersome and inefficient method.

If the private key of the RSA or other similar centers is compromised, this results in a "catastrophe", since anyone can impersonate other users.

Another user of public key encryption is the PC Fax program package offered by Microsoft for the transmission of FAX messages. The FAX may be encrypted using a password or a digital key. Again, they face the same problem of reliable key dissemination. Microsoft advises to exchange diskettes containing the key, clearly a difficult to use method. A public key can be exchanged by communication means, and again there is the problem of identifying the other party-how one is to know that the answering party is truly the person it claims to be. Caller identification is a problem encountered in various situations in the modern period of widespread use of global communications and information exchange.

SUMMARY OF THE INVENTION

According to the present invention, there is provided an apparatus and method for transferring the encryption key in a secure way, to facilitate establishing a secure communication link, comprising a key management device attaching to each user's encryption machine for the purpose of key distribution, and a secure encryption key distribution center providing the service of secure encryption key dissemination to authorized users.

According to one aspect of the present invention, there is provided a key management device attaching to each user's encryption machine, containing a list of secure communication partners and their respective encryption keys and parameters. To initiate a secure link session, the user keys in the identification of the desired addressee; if the details of that addressee are stored in the communication partners data list, then the encryption key and other communication parameters pertaining to that person are transferred automatically to the encryption machine, and the secure link is established.

Likewise, if this machine is accessed by another user's device, then the other device transmits its identification, and again the encryption key and other communication parameters are read from the list and transferred automatically to the encryption machine. A display is used to display to each user the true, reliable identity of other party, as established during the secure link setup.

According to another aspect of the present invention, if the desired addressee data is not found in the secure communication partners data list, then the key management device automatically connects a secure key distribution center, to get the encryption key and parameters for that addressee. This data is then transferred to the encryption machine and is also stored in the local list for future use.

According to a third aspect of the present invention, the communication with the key distribution center is protected by encryption using the public key method. The encryption key request is transmitted to the center after encryption with the center's public key; the center uses its private key to identify the inquirer and the addressee, and then transmits the desired information after encryption with the inquirer's public key.

Thus, only the center knows who asked what information, this preventing center impersonation; only the inquirer can decrypt the answer, thus an eavesdropper can't use the information. Furthermore, by providing only the public key of the desired addressee, a higher level of protection is achieved, since even if the key is compromised, the encrypted message using that key is still protected, since the private key was not disclosed.

According to a fourth aspect of the present invention, a secure encryption key distribution center is disclosed, performing the key distribution process as detailed hereinbefore, when addressed by a user's key distribution device. Also disclosed is a system including a plurality of such centers, connected in a wide area network for fast updating of key information so all the centers provide identical, updated information.

According to a fifth aspect of the present invention, the key distribution center creates a "certificate", that is a digital safe key/identification package for each user. The certificate can be used in an open link transaction between users for the secure link establishment. Each certificate includes the public key for a user, together with identification information for that user and the issue date, all encrypted with the private key of the key distribution center. The algorithm is based on a public key algorithm which is symmetrical with respect to the encryption and decryption keys, using package encryption with the private (decryption) key of the key distribution center. Unlike other key distribution systems, in the present invention there is no need to keep local lists of other users keys; during the link setup transaction, each party sends its certificate to immediately and reliably establish its identity.

According to a sixth aspect of the present invention, the certificate can be frequently changed, to maintain a high level of security. This protects the information if the user's key is compromised, and also provides for easy recovery if the private key of the center itself is compromised; this is a catastrophic situation for other systems.

According to a seventh aspect of the present invention, the certificate can be used to access a multitude of remote databases or other information services on an irregular basis, without the need to subscribe to all of them. The method involves the user to present a certificate issued to him by the center, including an authorization to access databases and an optional list of permitted operations therein.

According to an eighth aspect of the present invention, the certificate may be used for secure payment over insecure links, for example the Internet. The credit card information is protected from unauthorized use by the seller or third parties participating in Internet for example, by the inclusion of the credit card information in the encrypted certificate, with that certificate capable of being decrypted only by the authorized party, the credit card issuer for example.

According to an ninth aspect of the present invention, the certificate may be used for caller identification, with the subsequent communication being either encrypted or not. Caller identification is implemented by the exchange of certificates as detailed. Applications include Caller identification may be beneficial in a wide variety of applications, for example telephone and fax, cellular/wireless phone, computer communications, remote control/base station, access control.

According to an tenth aspect of the present invention, the certificate allows to implement flexible authorization schemes, for example its time period of validity may be limited as desired, according to application and circumstances. Another implementation is to include a list of authorizations or actions permitted for that user to do, or databases to access, or permitted operations in those databases.

Thus, the present invention facilitates secure communications between users having encryption machines which had no previous secure communications therebetween; furthermore, the invention provides protection for database services providers and these services' users, by facilitating user authentication and selective (encrypted) data dissemination. Furthermore, the invention provides for reliable caller identification for encrypted or nonencrypted communications.

Further objects, advantages and other features of the present invention will become obvious to those skilled in the art upon reading the disclosure set forth hereinafter.

DESCRIPTION OF THE PREFERRED EMBODIMENT

A preferred embodiment of the present invention will now be described by way of example and with reference to the accompanying drawings.

Figure 1:
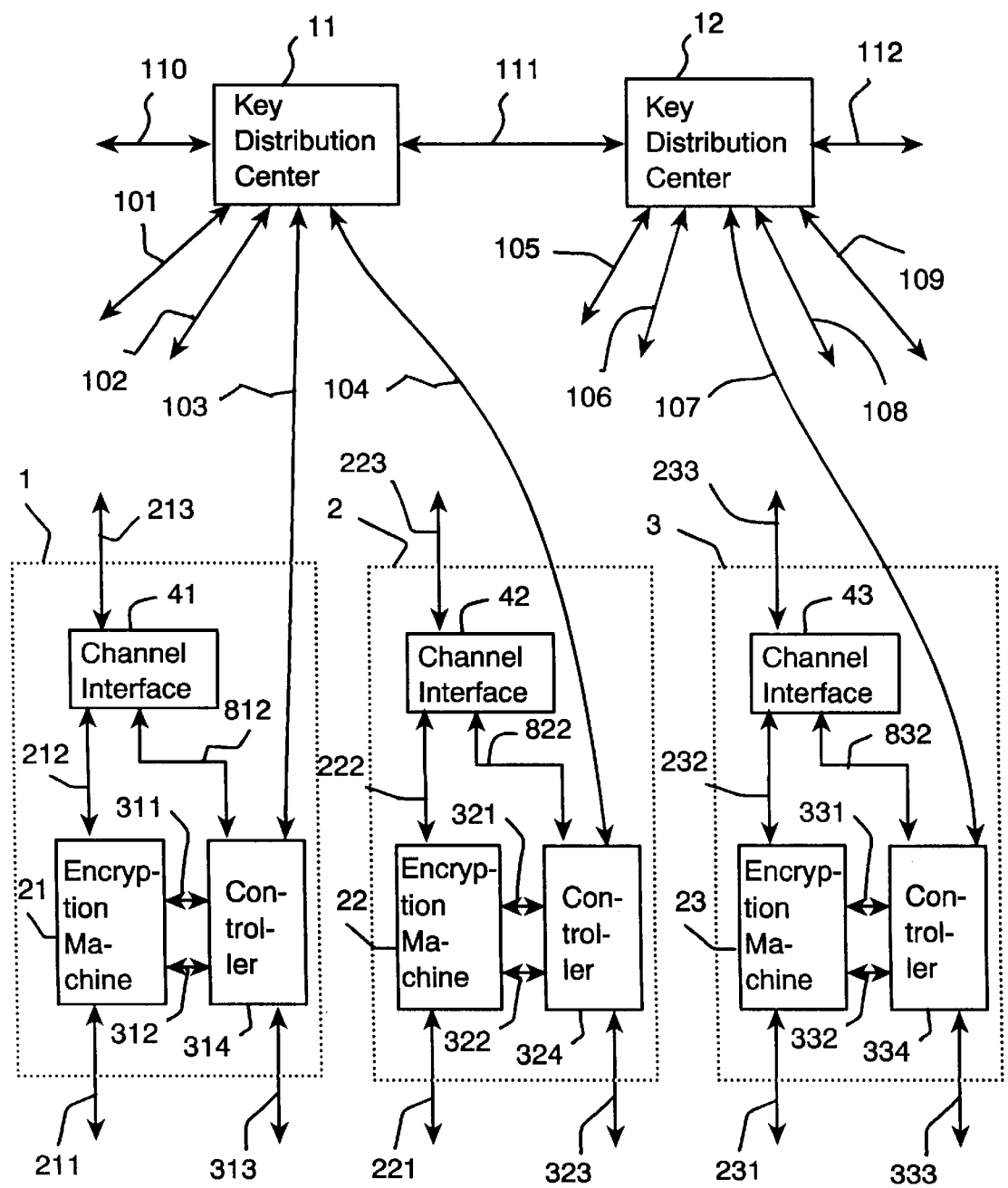
FIG. 1 is a description of the overall structure of the encryption key distribution system.

Referring to FIG. 1, an example of the overall structure of the encryption key distribution system, a user encryption facility 1 comprises an encryption machine 21 and a key management device. Encryption machine 21 includes plaintext channel 211 to communicate with the local user, and ciphertext channel 212 connected to another user through a standard communication channel 213, using wired or wireless communication means.

The key management device includes key management controller 314 and channel interface 41. The operation of the system components will now be detailed, assuming the initiator is facility 1 and the addressee is user encryption facility 3. The user enters the details of the desired addressee through channel 313, which may consist of a local keypad or a link to a computer.

This is the identification of the person or facility to establish a communication link with. If the keys for that addressee are found in the local list in controller 314, as detailed below with reference to FIG. 4, then key setup channel 311 is used to transfer the encryption and decryption keys for that addressee, together with optional additional parameters from key management device 314, to encryption machine 21, said keys being subsequently used by encryption machine 21.

The encryption and decryption keys consist of digital bits or words in serial or parallel form, usable for encryption or decryption using known methods like DES or public key algorithms like the RSA method.

If the keys for the desired addressee are not found in the local list, then key management controller 314 automatically connects the secure encryption key distribution center 11 through key distribution channel 103, and sends an inquiry message asking for the public key for the addressee, facility 3 in this example, the message being encrypted with the public key for center 11. Key distribution channel 103 is a communication channel used for that purpose.

Center 11 decrypts the message, verifying the identity of facility 1 in the process; the answer is sent to facility 1, encrypted with the public key for that facility. The method used for facility 1 identification is detailed below, see step 3b of the key distribution center 11 algorithm.

Facility 1 can now access facility 3, to initiate a mutual identification and key and parameters setting for a secure communication session. The communication path consists of controller 314, through data initiation channel 312, encryption in machine 21, through ciphertext channel 212, channel interface 41, communication channel 213 connected to communication channel 233 at facility 3, to channel interface 43, through ciphertext channel 232, decryption in machine 23, through data initiation channel 332, to controller 334.

Key setup channel 311 is used in facility 1 during an initiating procedure before the abovedetailed communications, to load the encryption and decryption keys in machine 21 from controller 314. Similarly, channel 331 in facility 3 is used to load the encryption and decryption keys in machine 23 from controller 334.

Channel interface means 41 includes means for performing functions as required by communication channel 213, like phone dialing, signal level control, impedance loading. Interface unit control 812 is used by controller 314 to control the channel interface means 41, according to the operating mode and link establishment stage, as detailed below.

Facility 3 also includes plaintext channel 231, ciphertext channel 232 connected to communication channel 233, addressee details channel 333, interface unit control 832, key distribution channel 107.

A secure encryption key distribution center 11 is connected to a multitude of user encryption facilities, two of these being designated as 1, 2 in FIG. 1. Center 11 uses key distribution channels designated 101, 102, 103, 104. Center 11 includes a (not shown) computer including a list of users with their respective public keys and other data: each user's phone number and address, last update date, whether a dialer/user automatic identification is to be performed. The computer also controls the various activities in the center with the encryption machine, the channel interface and the local operator.

The computer also includes an interface to operator (not shown) for status or warnings display, control and manual keys update. Channel interface means (not shown) in center 11 are similar to channel interface means 41 in facility 1 as detailed above, including means for performing functions as required by communication channels 101, 110 like phone dialing, signal level control, impedance loading. Since center 11 is capable of connecting simultaneously to numerous users, a channel interface having this capability is used, as known in the art.

Encryption machine means (not shown) in center 11 are similar to that in facility 1. Faster, more powerful machines may be used for higher throughput.

Facility 2 comprises encryption machine 22 and key management controller 324, with interface unit control 822, channel interface means 42, communication channel 223, data initiation channel 322, used in facility 2 to communicate with facility 1 or any other user. Facility 2 also includes encryption machine 22, key management controller 324, plaintext channel 221, ciphertext channel 222, addressee details channel 323, key distribution channel 104. Channel 321 is used to load the encryption and decryption keys in machine 22, from controller 324.

Likewise, key distribution center 12 is connected to a multitude of user encryption facilities, like facility 3, using key distribution channels designated 105, 106, 107, 108, 109. All the centers 11, 12, . . . contain the same list of encryption keys.

Inter-center links 110, 111, 112 are used to connect the key distribution centers for key data updates, using a digital, secure (encrypted) format. Thus, after a user updates his/her key with the local center, the lists in all the centers are updated automatically, to provide updated information to all the system's users.

Thus, the abovedetailed apparatus and method for transferring the encryption key allow to establish a secure communication link between two facilities with encryption machines. Moreover, reliable identification of the parties to a new communication session can be performed, that is each party can ascertain the identity of the other party. The reliable identification can be performed between parties which had no previous communications therebetween, the parties being strangers to each other and at separate locations, remotely located; the identification process uses the same data communication link as the data communication to be performed after the identification stage.

Furthermore, each user equipment can include a key generation machine, that is a processor which accepts a random number from the user and generates a key pair (a public key and a private key). Only the public key is transmitted to the center or otherwise displayed; the private key is kept secret, inside the machine, and is only used to decrypt or encrypt messages. This apparatus and method allow to generate new keys whenever the user so desires, and the private key is securely kept.

Additional physical key protection means can be used, for example the key generation machine is mounted in a cellular telephone; the user personally keeps that telephone, thus ensuring that the private key is safe.

For the use of the invention in a cellular telephone, another implementation is not to include the key pair generating machine in the telephone; the user can go to a cellular telephone company center to compute there and load new keys, for example by connecting to terminals in that center.

Another implementation uses an external key generating machine carried by a cellular telephone representative. The machine has the processing ability required for key generation, but has no internal memory to keep the generated keys. Thus, the machine is connected to a cellular telephone, it generates the key pair and transfers the keys to the cellular telephone.

Since the machine cannot keep the keys, only the user of that cellular telephone has the key pair, thus the keys cannot be compromised even by the telephone company personnel.

This method for user authentication and selective data dissemination can be used in financial transactions, for example to pay with credit cards through insecure links, and where the payee himself may be unreliable as well. An unreliable payee cannot make unauthorized use of the information in the card, since that information is encrypted and is not available to him/her.

The method can be used to establish cellular phone links, while preventing an impersonator from stealing phone communication rights from the legitimate telephone owner. The method can be used as well to protect wireless remote control devices (for example car locks or garage openers).

The operation of the key management device was described in the context of the whole secure communication system.

The algorithm for each of the system components will now be detailed, assuming the addressee is user encryption facility 3 comprising an encryption machine 23, key management controller 334 and interface 43. These algorithms are executed concurrently or sequentially.

The algorithm for connection initiating device 314 comprises the following steps:

1a. Device 314 receives the addressee 3 details through channel 313
2a. If the addressee 3 details are found in the local list, then: the encryption and decryption keys are transferred to machine 21 through channel 311; jump to step 7a (No need to contact the key distribution center 11)
3a. The desired addressee 3 details, together with identification details for facility 1 and a group of random bits, are encrypted using the public key for key distribution center 11 to form an inquiry message. Communication channel 103 is established with center 11, and the encrypted inquiry message is send to center 11 (which then performs steps 1b to 5b and 7b, or 1b to 3b and 6b, 7b, as detailed below)
4a. The answer from center 11 (step 5b there) is decrypted using the private decryption key for facility 1. That answer contains the public key for the desired addressee 3 and the group of random bits sent to center 11;
5a. If the received group of random bits are not identical to the transmitted random group, then jump to step 6a (Answer from impersonator); otherwise the answer is accepted as legitimate, then: the public key contained therein is transferred to machine 21 through channel 311, together with the private key for facility 1; update local keys list with the key received from center 11; jump to step 7a
6a. Display message: Failure to get public key for desired addressee; Stop
7a. Prepare an initial message for facility 3, comprising data identifying facility 1 and a group of random bits, encrypted with the public key for facility 3
8a. Use channel interface 41 to access facility 3 through channel 213, which is connected to channel 233 at facility 3. Send initial encrypted message to facility 3 (facility 3 performs then steps 1c to 9c or part of these steps, according to its algorithm detailed below)
9a. Caller/addressee identification: Receive message from facility 3, decrypt with the private key for facility 1, extract the group of random bits sent to facility 3 and compare with the group sent; if not identical, then jump to step 10a; otherwise: encrypt the received random bits generated in facility 3 with the public key for facility 3 and send the encrypted message to facility 3; jump to step 11a
10a. Display message: Addressee identification failed; Stop
11a. Display message indicating successful link establishment; End The algorithm for key distribution center 11 comprises the following steps:

1b. Distribution center 11 receives encrypted inquiry message from facility 1 through channel 103, together with automatic dialer identification data received
2b. The message from facility 1 is decrypted using the private decryption key for center 11.
3b. The inquirer identification contained in the message is compared with the automatic dialer identification data received. If in disagreement, then jump to step 6b
4b. Compile an answer message comprising the desired addressee public key and the group of random bits received; encrypt using the public key for facility 1, that key being stored in the center 11 database together with the other encryption (public) keys
5b. Send the encrypted message to facility 1; jump to step 7b
6b. Display warning message: Illegitimate access event
7b. Store details of transaction for optional future audit; End The algorithm for the addressed device 334 comprises the following steps:

1c. Controller 334 receives an initial message through channel 233, interface 43, channel 232, decrypted in machine 23, through data initiation channel 332; this is the initial message from facility 1. The message is decrypted with the private key for controller 334, to extract the message including facility 1 identification and the random bits group;
2c. If the details for facility 1 are found in the local list, then: the encryption and decryption keys are transferred to machine 23 through channel 331; jump to step 7c;
3c. The facility 1 details are encrypted using the public key for key distribution center 12, together with identification details for facility 3 and a group of random bits. Communication channel 107 is established with center 12, and the encrypted message is send to center 12, similar to the abovedetailed facility 1 inquiry of center 11;
4c. The answer from center 12 is decrypted using the private decryption key for facility 3. That answer contains the public key for facility 1 and the group of random bits sent to center 12;

5c. If the received group of random bits are identical to the transmitted random group, then: the answer is accepted as legitimate; the public key contained therein is transferred to machine 23 through channel 331, together with the private key for facility 3; update local keys list with the key received from center 12; jump to step 7c 6c. Display message indicating failure to get public key for facility 1; Stop 7c. Caller/addressee identification: Compile a group of random bits, add to the random bits received from facility 1 and encrypt using the public key for facility 1; send the message to facility 1 through interface 43 and channel 233; receive the answer from facility 1, decrypt with the private key for facility 3, and compare with the initial group sent; if identical, then jump to step 9c 8c. Display message: Caller identification failed; Stop 9c. Display message indicating successful link establishment; End For performing these algorithms and related functions, each facility of initiator/addressee can perform in one of the following modes of operation:

1. Initiate clear link communications with another facility
2. Initiate encrypted link communications with another facility
3. Accept clear link establishment with another facility
4. Accept encrypted link establishment with another facility
5. Initiate encrypted link with key distribution center to get other's key
6. Initiate encrypted link with key distribution center to update own key recording in the center's list
7. Key update: prepare pair of keys; update both in local lists; send only public key to center.
8. Key input through [local] keypad, barcode reader, tape reader, magnetic tape reader, voice, another serial communication channel like RS-232 9. Key input from another facility, when that facility changes its keys and sends the new public key to its known addressees (according to the local keys list of that fcility).

The abovedetailed algorithms, being implemented by the key distribution channel, the communication initiator 314 and the addressee 334, provide the benefit that the communication with the key distribution centers 11, 12 is protected by encryption using the public key method. Thus, the encryption key request is transmitted to the center 11 after encryption with the center's public key, such that only the center 11 can decrypt the message using its private key, to identify the inquirer 314 and the addressee 334.

Safe communications are achieved since only after inquirer authentication, center 11 transmits the desired information after encryption with the inquirer 314 public key.

Thus, only the center 11 knows who asked what information, this preventing center impersonation; only the inquirer 314 can decrypt the answer, thus an eavesdropper can't use the information. Furthermore, by providing only the public key of the desired addressee 334, a higher level of protection is achieved, since even if the key is compromised, the encrypted message using that key is still protected, since the private key for 334 was not disclosed.

Additionally, a secure encryption key distribution center 11 structure and operation was disclosed for performing the abovedetailed key distribution process.

FIG. 1 also details a system including a plurality of such centers, detailed as 11, 12 there, connected through links 110, 111, 112 in a wide area network for fast updating of key information.

Figure 2:
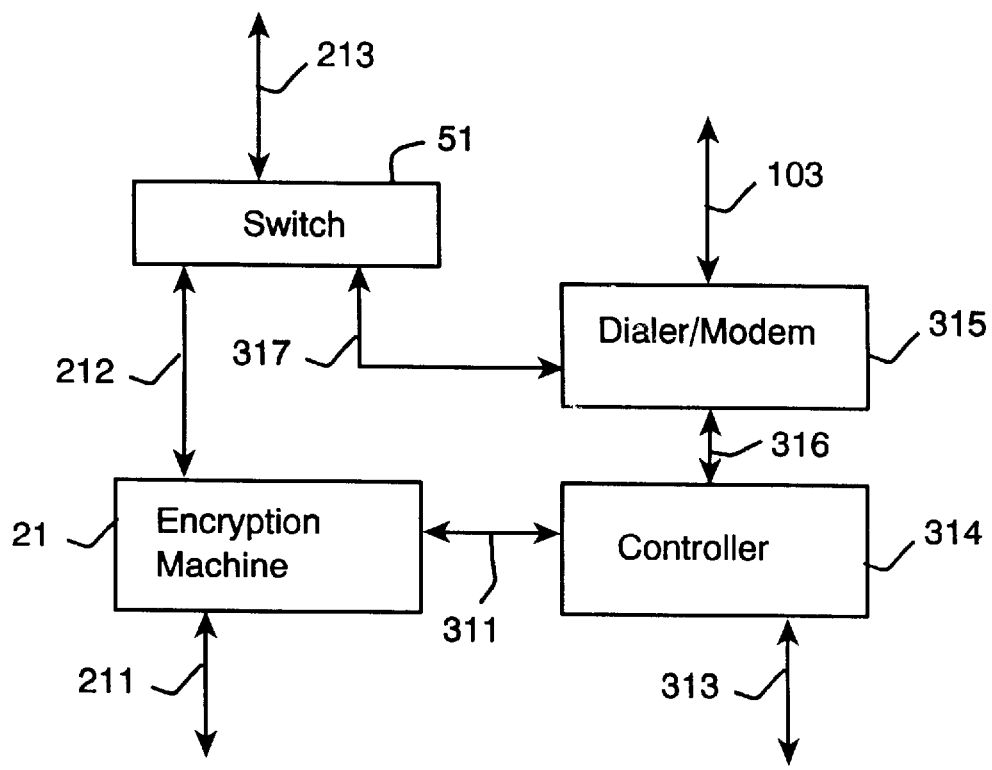
FIG. 2 details the key management device connected to a user's encryption machine for analog communications.

FIG. 2 details the structure and operation of a key management device connected to a user's encryption machine 21 for analog communications.

The key management device comprises controller 314, dialer/modem 315 and data switch 51. Controller 314 receives the details of the desired addressee through channel 313, and scans a list of known communication partners in its internal memory (not shown).

If the keys for the desired addressee are not found in the local list, then controller 314 automatically connects the secure encryption key distribution center using dialer/modem 315, through channel 316 and channel 103. The illustrated implementation uses a modem/dialer 315 having two outputs. Controller 314 includes digital encryption means (not shown) for secure communication with the key distribution center through channel 103.

Data switch 51 connects the key management device channel 317 to communication channel 213 during the secure link setup stage. During the subsequent communication stage, switch 51 connects encryption machine 21 to communication channel 213. Controller 314 performs the stages of the secure link establishment and controls the state of switch 51 according to the abovedetailed algorithms. Channels 211, 212, 311 were already detailed, with reference to FIG. 1.

Figure 3:
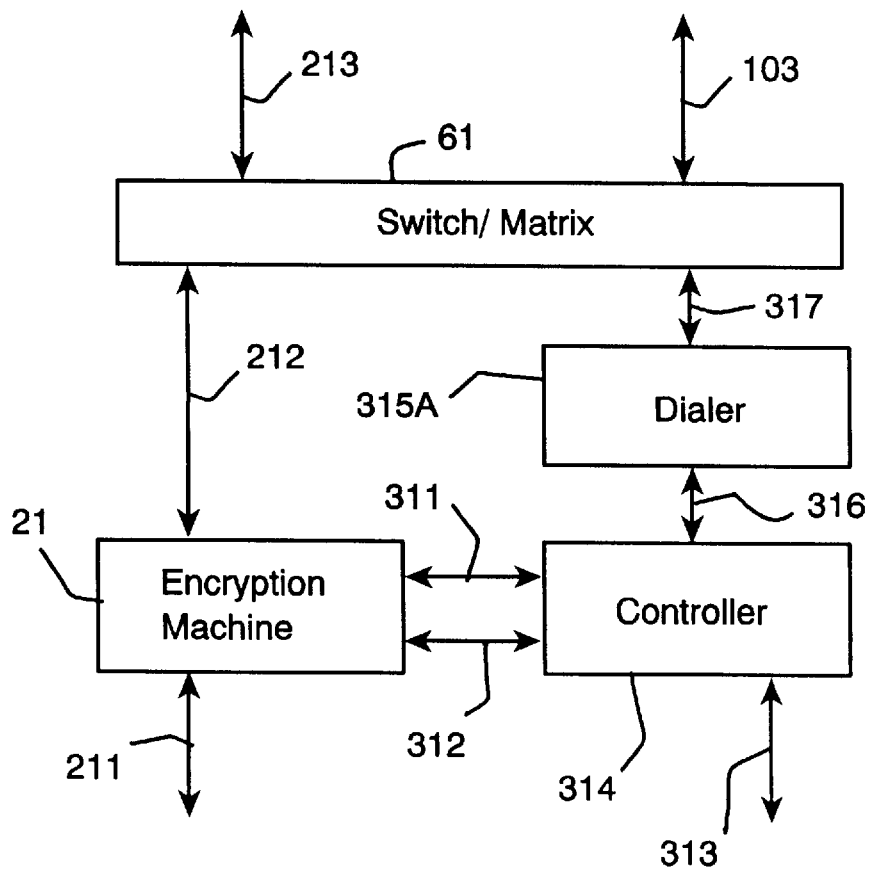
FIG. 3 illustrates the key management device connected to a user's encryption machine for digital data communications.

FIG. 3 details the structure and operation of a key management device connected to a user's encryption machine 21 for digital communications. The key management device comprises controller 314, dialer 315A and data switch/matrix 61. Controller 314 receives the details of the desired addressee through channel 313, and scans a list of known communication partners in its internal memory (not shown).

If the keys for the desired addressee are not found in the local list, then controller 314 automatically connects the secure encryption key distribution center (not shown) using dialer 315A, through channels 316, 317 and 103. This implementation uses a dialer 315A having one output. Controller 314 uses digital encryption machine 21 for secure communication with the key distribution center through channel 103, using plaintext channel 311 and ciphertext channel 212.

Data switch/matrix 61 connects channel 212 to channel 103 for communication with the key distribution center; it connects channel 212 to channel 213 during the secure link setup stage and during the subsequent secure communications session.

To establish a link with the key distribution center or with the addressee facility, switch 61 connects dialer 315A to channel 103 or channel 213 respectively, under controller 314 control. Controller 314 performs the stages of the secure link establishment according to the abovedetailed algorithms. The operation of channels 211, 312 was already detailed.

Figure 4:
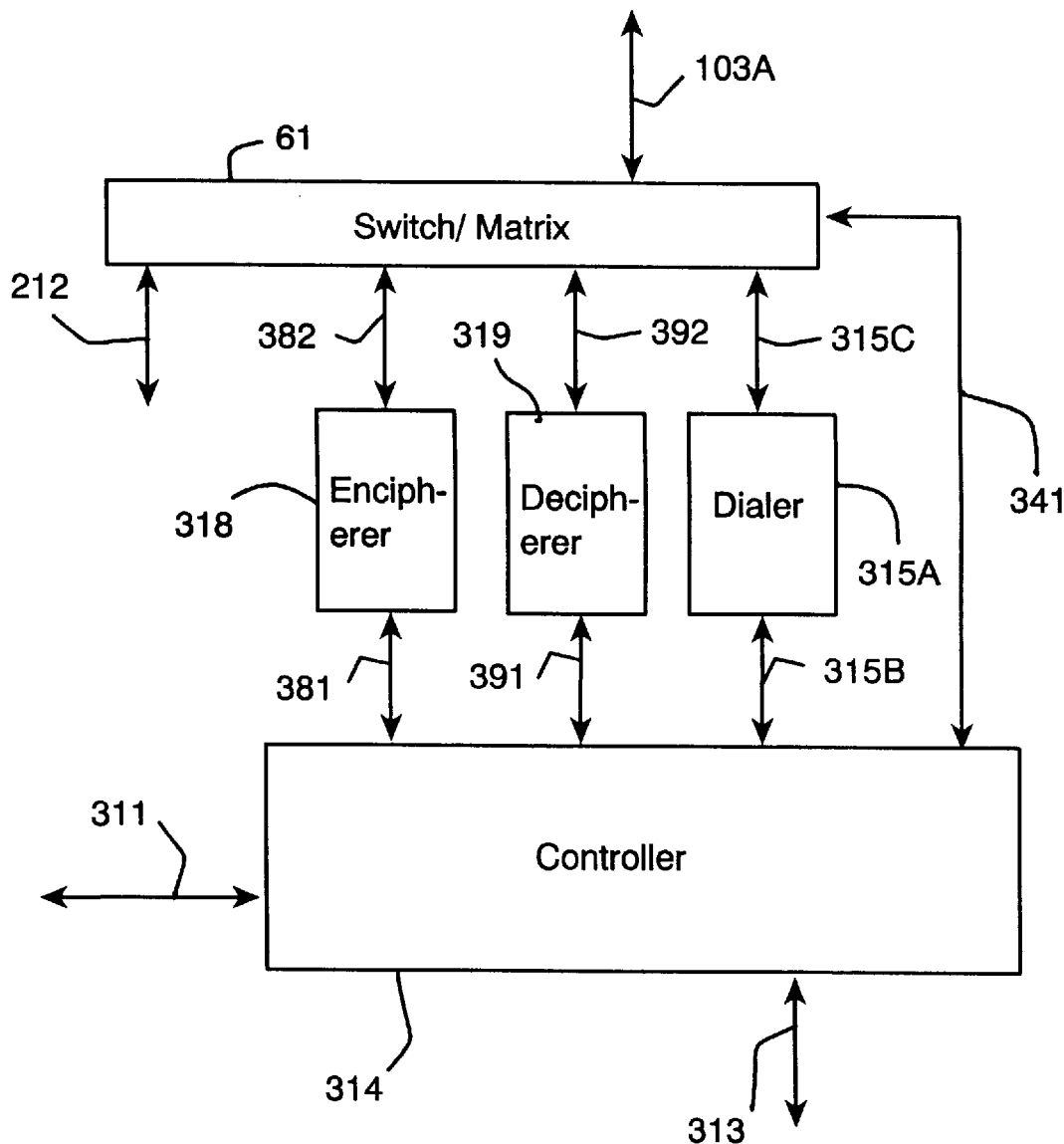
FIG. 4 details the key management device structure.

FIG. 4 details another implementation of the key management device, for use with an analog encryption machine without dialing capability nor digital communications capabilities. A telephone dial line 103A is used both for communications with the key distribution center and the desired addressee. The key management device comprises controller 314, dialer 315A, encipherer 318, decipherer 319 and data switch/matrix 61. Controller 314 receives the details of the desired addressee through channel 313.

If the keys for the desired addressee are not found in the local list, then controller 314 automatically connects the secure encryption key distribution center using dialer 315A, through channels 315B, 315C and 103A. Controller 314 uses digital encryption means 318 and decryption 319 for secure communication with the key distribution center through channel 103A.

Data switch/matrix 61 connects channel 382 or 392 to channel 103A for data communication with the key distribution center or the addressee; it connects channel 103A to channel 315C during the dialing period. Data switch/matrix 61 operation is controlled by controller 314 through channel 341.

Controller 314 performs the stages of the secure link establishment according to the abovedetailed algorithms. After the successful link establishment, controller 314 transfers the encryption and decryption keys to the encryption machine to be used for the secure communication session, through channel 311, then sets switch 61 to connect ciphertext channel 212 from the encryption machine to communication channel 103A. Controller 314 uses channels 381 and 391 to connect to encryption means 318 and decryption means 319 respectively.

There are a wide variety of applications for the abovedetailed key distribution system.

For example, in database systems, the encryption protects both the database and the user; by using encryption, user authentication can be performed, thus controlling information distribution only to qualified users. Moreover, the encrypted information can only be used by the legitimate customer. This also protects the legitimate user from unjustified bills resulting from an impersonator using the database.

Various implementations of the abovedetailed system will become apparent to persons skilled in the art. For example, FIG. 1 details a system implementation using separate channels for key distribution (103) and for communications with another user (213); a different implementation may use the same channel for both purposes.

Communication channels 213, 103, . . . may consist of fixed links set up for that purpose, like point to point wired connections or wireless links at predefined frequencies, or of temporary links like phone dial connections set up specifically for the designated functions and disconnected after the communication session completion. The channels 212, 103 . . . may then contain the telephone exchanges, wiring, wireless components and multiplexers and/or related components of the phone system known in the art. Communication channels 212, 103, . . . may consist of wired and wireless links, like satellite or cellular communications, LAN or WAN systems.

Various algorithms implementations will occur to persons skilled in the art, for example in case of link establishment failure and key obtained from local list; then a key inquiry procedure is initiated with center 11, since the addressee details in the local list may be obsolete; the key from center 11 is compared with the key in the local list; if not identical, then: update local list; try again to establish link.

A procedure to update encryption keys may be periodically initiated at each facility, the procedure comprising key pair computation, local list update and sending the public key to center 11 through a secure link and using a secure procedure; optionally, the new key may be transmitted to the known addressees as found in the local list.

In another implementation of the abovedetailed system operation, open communications (not encrypted) and without self identification, are used to inquire the center about the desired addressee's key and to receive the center's response.

The danger of impersonation or disinformation by the center or the addressee are minimal, since the center doesn't know the identity of the inquirer, so no selective attack can be performed, against a specific facility; if a false key is given, this will only result in the authentic addressee being able to respond; therefore the handshake will fail and the communications will not take place, thus preventing the protected data from being transmitted to an undesired destination.

In another implementation of the present invention, key distribution center 11 creates a digital safe key/identification package, as detailed below. The method uses a symmetrical public key algorithm, that is either the encryption or the decryption key can be used for message encryption, with the other key being used for decryption. A user, for example facility 1, inquires the center 11 about its own (facility 1) public key; center 11 responds with a message including facility 1's name and key, all encrypted with the private key of center 11.

Now, anyone can open that message with the public key of center 11, since the encryption algorithm is symmetrical; but it is very difficult to create a false message, since the center 11's private key, which was used to create the message, is unknown to the public.

Facility 1 can transmit that encrypted digital message "as is" to a desired addressee, facility 3 for example, to say in effect "I claim to be facility 1, and this is truly my public key, as attested by the center 11 which is known and accepted by both of us". Facility 3 opens the received digital message with the known center's public key, thus ensuring that the public key for facility 1 is that as claimed. In case the digital message is intercepted by an impersonator and subsequently used for communication with facility 3 for example, the communication handshake will fail since the impersonator will not be able to decrypt the answer from facility 3, since it doesn't possess the facility 1's private key. Because of this added protection, an open link (not encrypted) can be used by any user to ask the center 11 about its own or any other user's public key; the center's response, the encrypted message, can be used in an open link with another user to establish a secure link between any two users.

With each user storing a digital message including the encrypted center's answer regarding its own public key, no further communications with the center 11 are required nor a list of other users has to be kept, in order to establish secure communications therebetween: Each user sends to the other its own identification, the encrypted message from center 11 containing its own public key; each user decrypts the received message with the known center's public key, and each user is sure that that is the true key of the other. That public key is then used for subsequent communications handshake and data transfer.

The encrypted response message sent from center 11 may contain the response date and time, in addition to the key and the key user's identification. That date and time may be used to ensure that an updated key (not obsolete) is used.

Advantages of the abovedetailed method: the center can be accessed on an open line (not encrypted), without self identification. This protects from disinformation by an intruder at the center. For example, a fraudulent center operator or a fraudulently inserted routine may wait for the inquiries of a specific user, and respond falsely only to selected users which they desire to attack, for maximum damage and difficulty of detection. By using open inquiries, without self identification, this danger is minimized.

Various key management device implementations will occur to persons skilled in the art, like using a DIP switch or solid state memory for the encryption key setting, or a link to a personal computer. Solid state memory devices may include EEPROMs, flash memory, CMOS RAM or other device known in the art. Computing means may be used to compute new encryption keys or key pairs for public encryption.

A plug-in device may contain the keys, which device may be programmed at the key distribution center, then inserted by the user in the key management device; this ensures easy key updates as required, together with good physical protection. For example, the plug-in device may be kept in a safe while not in use.

Each user equipment can include a key generation machine, that is a processor which accepts a random number from the user and generates a key pair (a public key and a private key). Only the public key is transmitted to the center or otherwise displayed; the private key is kept secret, inside the machine, and is only used to decrypt or encrypt messages. This apparatus and method allow to generate new keys whenever the user so desires, and the private key is securely kept.

The random number from the user is optional; where desired, an internal random numbers generator can be used, or a time- related number may be used to generate the key pair.

The method for use of the equipment including the key generating machine will now be described by way of example.

The method used for the initial key pair generation:
1d. The user is given the equipment, for example the cellular telephone or remote control unit, at an authorized distribution center; the user is physically identified there, for example by means of an identification card or driver license. Thus, the center is sure that the equipment was delivered to the person which is supposed to receive it;
2d. The equipment is activated to generate an encryption key pair, that is a private key and a public key. The private key is never displayed or transmitted, but is only kept inside the equipment. The public key is displayed and/or transmitted by a digital channel to the center;
3d. The user- related information is registered (written) in memory means in the center, that information including the user identification details and the public key generated as detailed in (2d) above; and
4d. Anyone can now ask the center what is the public key of that specific user, and the inquirer will be given a reliable answer, that is encrypted with the center private key, that that indeed is the public key for the user as asked; the user can ask about his own key, and will be given a reliable, encrypted answer as well.

Another implementation of (2d) above, for use in a cellular telephone, consists in using facilities in a cellular telephone company center to compute and load new keys, for example by connecting to terminals in that center.

Still another implementation of (2d) above uses an external key generating machine carried by a cellular telephone representative. The machine has the processing ability required for key generation, but has no internal memory to keep the generated keys. Thus, the machine is connected to a cellular telephone, it generates the key pair and transfers the keys to the cellular telephone.

The method used for subsequent key pair update:
1e. The user connects the center and identifies himself, that including the following steps: He/she receives a random data block from the center, encrypted with user's public key; the user decrypts that message with his private key and encrypts it back with the center's public key; the encrypted message is sent back to the center; the center decrypts the message with center's private key and verifies that indeed the received message is identical with the transmitted message, this being proof of user's identity;
2e. The equipment is activated to generate an encryption key pair, that is a private key and a public key. The private key is never displayed or transmitted, but is only kept inside the equipment. The public key is encrypted with center's public key and is transmitted by a digital communication channel to the center;
3e. The center decrypts the message with its private key, thus reliably receiving the new, update user's public key; and
4e. The new, updated user- related information is registered (written) in memory means in the center, that information including the user identification details and the public key generated as detailed in (3e) above.

This method allows for a distributed center structure, with small local centers for user keys initial setting and subsequent update. Each local center then transmits the updated public key to the regional or worldwide center.

Another implementation of (2e) above uses an external equipment to compute and load the key pair into the cellular telephone, as detailed in connection with step (2d) above.

Another variation of (2e) above would be to the user to encrypt the new key with that user's old private key, then the center using the old user's public key to decrypt it.

Still another variation of (2e) would be to the user to send the new public key without any encryption at all, since the public key is not secret.

If the equipment containing the private key is lost, the system security is preserved by the following method: The user, as soon as he detects the equipment loss, notifies the center accordingly. The center then records that that user's public key is obsolete, and any other user asking for that user's public key will be notified accordingly.

The user can load a new key pair while he reliably identifies himself, for example as detailed in method (1d) to (4d) above.

An optional watchdog circuit can be attached to the private key memory means. If a predefined time limit is exceeded without the equipment being used or updated from center, then it is assumed that the equipment was lost, and the private and/or public key is destroyed.

The user equipment may include a complete message from center, that message including (user's name; user's public key; expiry date or last update date) all encrypted with center's private key. This allows the user to identify himself for safe communication purposes, as detailed above. The user can update his public key with the center anytime he desires, for example if he suspects the previous key was compromised; an impostor having a copy of the old message from center will not be able to use the old copy subsequent to that public key update.

If unauthorized attempts at reading the private key are detected, then the private key is destroyed as well. Additional physical key protection means can be used, for example the key generation machine is mounted in a cellular telephone; the user personally keeps that telephone, thus protecting the private key.

This method for user authentication and selective data dissemination can be used in financial transactions, for example to pay with credit cards through insecure links, and where the payee himself may be unreliable as well. A method to achieve that goal is as follows, for example while User desires to buy an article from Seller, and to pay using his credit card, for example Visa:
1f. User decides on the article to buy and finds its price;
2f. User encrypts the information (Seller details; article price; User credit card number and expiry date) with the Visa public key;
3f. User sends his/her order to Seller, including the encrypted information as per (2f) together with the non-encrypted information, including (Seller details; desired article details and price; User details, like name and address);

4f. Seller encrypts the whole message as per (3f), including the clear and the encrypted parts, with Visa's public key and sends it all to Visa;

5f. Visa decrypts the message using its private key once or twice as required, verifies the integrity of the whole message and checks User's credit, and prepares a sales authorization message;

6f. Visa encrypts the sales authorization message with the private Visa key or seller's public key and sends the message to Seller; and 7f. Seller decrypts the message with Visa public key or his private key according to the key used at encryption, thus receiving a secure, provable and untamperable with authorization to that sale.

The abovedetailed method offers the following benefits: User's credit card details (card number, expiry date) are protected from eavesdroppers on the communication channel and from Seller, since these details are encrypted with Visa's key, which only Visa can read; thus, no unauthorized use of User's card information can be made. Seller can't tamper with the price, since Seller has no access to the encrypted sales price data. Seller can prove that he received Visa approval for that sale, since only Visa can encrypt that authorization message with Visa's private key.

In another variation, User encrypts the information sent in (3f) above with Seller's public key, to ensure no unauthorized person can read the order details at all. Only Seller can decrypt the information and read it using his private key, thus preserving the information integrity on one hand, and providing proof that Seller received User's order on the other hand.

User can save Seller the effort to connect Visa to verify User's credit, as follows: User connects Visa before buying from Seller, and ask for a credit verification; Visa sends a package to User, including (User's details; credit approval and/or credit limit; time and date stamp) all encrypted with Visa's private key; User sends that package to Seller; Seller opens the package with Visa's public key, thus accepting Visa's approval for the sale.

This method can be used to implement a debit or money card, since each time a sale is authorized, Visa deducts the amount of that sale from that user's credit, until a limit is reached and no sales approvals are issued thereafter.

For regular plastic credit cards, the information recorded on the magnetic stripe may be encrypted as well, to protect the information in the card. Encryption is done using Visa's public key for example. The reason is that the information is passed to Visa anyway for approval and payment to seller, and only Visa actually needs the information stored in that card. It is safer that the information in the card should not be displayed to seller nor be stored in seller's data storage means.

That approval service may also be performed by an independent services provider, for example an insurance firm; that firm can offer insurance and approval services, with fees varying according to the update/verification rate: if more frequent verifications are made, then a lower fee may be asked for, since the risk is lower.

The method can be used to establish cellular phone links, and to protect wireless remote control devices, for example car locks or garage openers. For that purpose, the cellular local center (or the garage) sends an encrypted message to User; user decrypts it with his private key, thus proving his identity; this reliable identification method thus prevents unauthorized use of cellular telephone services by an impersonator; similarly, a garage opening device or a wireless car lock system can be protected from unauthorized use.

Thus, reliable identification of the parties to a new communication session can be performed, that is each party can ascertain the identity of the other party. The reliable identification can be performed between parties which had no previous communications therebetween, the parties being strangers to each other and at separate locations, remotely located; the identification process uses the same data communication link as the data communication to be performed after the identification stage. The abovedetailed secure communication means can also be used for fax communications as well.

The abovedetailed system and method allow a person on the move to establish secure communications with another person, from anywhere to any place on the globe. Various data communication means can be used, for example telephone lines, radio wireless, noncontact means like ultrasound or magnetic or capacitive. Acoustic couplers can be used to connect to a telephone line without disconnecting the telephone or the lines, but through the telephone microphone and speaker, like that used in modems.

Magnetic induction means may be used to connect to the telephone lines, for example using a ferromagnetic loop placed around a telephone wire; a second winding on that ferromagnetic loop generates alternative signals, which are induced in the telephone lines without disconnecting these lines. The alternative signals contain the desired information to be transmitted.

Similarly, electrical signals may be induced into a magnetic card reader in a way similar to that used by the credit cards; again, the alternative signals contain the desired information to be transmitted.

The key management device contains a connector for connecting a plug- in device containing the encryption key storage means; the plug- in device contains a corresponding connector and a nonvolatile memory for storing the key while being disconnected from the key management device. This allows for the key to be transportable, to be carried to the center for programming, or for being kept in a safe place.

According to the structure and capabilities of encryption machine 21, machine 21 may be used to encipher/decipher messages with center 11 and key setup messages with facility 3, or additional encryption means in controller 314 may be used for that purpose. Therefore, the key distribution device can use the encryption and dialing facilities of the existing encryption machine, or these features may be incorporated in the key management device.

The device may include a "CLEAR/SECURE" switch, which is set by the user to start controller dialing and secure communication establishment. The secure communication device can include a display, for communication related data and the details of the partner to the communication session. Thus, after secure key exchange and secure communication link establishment, each party can see the name and details of the other party; each party can thus ensure that he is speaking with the desired person.

Various means for key distribution center 11 can be used, like automatic dialer identification, together with said dialer information being stored in the distribution center for comparison with the actual reading. This feature may be optional, to also support users which don't have this capability or where the calls pass through a switchboard.

A free key distribution service can be provided to qualified users, like the use of a 800 number in the U.S.A., or an 177 number in Israel.

Suitable means are required to protect the center's public key. One possibility is frequent key changes, and public notification, for example by proper publications such as BBS' or other data bases.

Center 11 may comprise a centralized structure with one large computer with communication to remote locations, or a distributed secure network of local centers, with country-wide or global total coverage.

The method of operation of the center in the present invention will now be detailed in comparison with existing key dissemination centers.

PGP key management: PGP maintains a public server containing a list of public keys. PGP server accepts and maintains a file with a collection of identification packages (KeyID). Each identification package K includes the name and details of a key holder A, together with his/her public key, which are signed (authenticated) by a third party B which encrypts the package with his/her private key.

Another party C desiring to communicate with a key holder A searches for an identification package K signed by someone known/accepted by them, thus "ensuring" that that is the true key, which truly belongs to the person as claimed; the third party is "known/accepted" in the sense that B believes that its encryption key pair are as claimed and are not compromised.

Since any single third party B may be unknown to the other party C, key holder A submits a plurality of identification packages Ki, each signed by a different third party Bi; another party C desiring to communicate with B searches all the packages Ki belonging to A, until he finds one signed by a third party Bj known to him. Bj is the "common acquaintance" to A and C. Thus, the PGP server maintains a file with a collection of identification packages for a multitude of users, and with a plurality of packages for each user. Thus it may be difficult to keep this vast quantity of information to disseminate it to users.

Another key dissemination method is employed by VeriSign, which distributes digital "certificates" valid for a long time period (for example 5 years). A certificate includes the name and additional information for a user, together with the public key for that user and the expiry date of the certificate, all encrypted with the private key of the issuing authority. Another certificate is issued to that first issuing authority by a higher second authority, that certificate including the public key and additional information for that first issuing authority, and so on.

This is a hierarchical authorization structure, with user A bringing signatures from persons/entities Bi at several levels, until a level high enough is reached which is also part of the hierarchy of C, thus establishing the key transfer which is authorized by the common accepted third party.

A great effort is put into ensuring the identity of a user before issuing a certificate, and in keeping the certificates; however, a certificate once issued may be compromised during its long lifetime, in which case it is difficult to replace it; the other party may not known that the key is compromised, and may not ask the center about the validity of the certificate (since it is within the validity period).

The center has no control over the use of an issued certificate while the certificate is still valid, during the long period as set at issue time; only the "black list" at the center may give a warning to that effect, but that can only prevent communications. A reliable key has yet to be exchanged between the parties, which is difficult in this case. Users of this system are encouraged to keep a local list of certificates, but this does not solve the abovementioned problems, although it may reduce the workload on the center.

The center in our invention, however, contains a single package for each user for any specific key; the same user may maintain several keys, for different uses or levels of security or under different pseudonyms or to be assigned each to a specific person holding a specific position. This key management method is beneficial in situations where a person changes position in a firm; the new person in the job will not be able to read mail addressed to the previous person, since the new person will be given a new key pair. PGP server and the other centers cannot cope with such a situation in an easy manner.

In the present invention, the center checks the validity of the identification package by identifying the user, for example by his/her holding a valid credit card and/or calling from a specific location or phone number. This is a lower level of security, implemented by less severe user identification than the other methods, with the express purpose of providing an easily accessible and usable method of key dissemination for the common people; this level of security, however, is maintained all the time with the presented method of easy issue of updated certificates at frequent times; thus, the present method is overall more secure than other methods, and it is also more easier to use.

If required, a subset of the certificates may include a higher level of security, based on more stringent user identification for example. This can easily be integrated in the present invention. But for widespread use, even users in that more secure subset are likely to use certificates issued at the lower level, to communicate with the majority of the users. The center issues a certificate which is a digital file/document containing the name/pseudonym and details for a user, together with his/her public key and the issue date, all encrypted with the private key of the center. The center ensures there are no duplicate user names/pseudonyms; new names can be added with relative ease, but to change an existing name the center has to approve the transaction, thus achieving better user key protection.

To ensure key validity in VeriSign, each package includes an expiration date. Each key is intended to be used for the whole period as planned, for example one year or two or five years. This is a weak link for other systems as well, for example RSA. As the key approaches its expiry date, the chance of its being compromised increases, and more verification requests will be placed with the center. In our invention, however, the method is such that the identification package includes the issuing date, such that any other party can estimate the validity and reliability of the key therein. Any key update results in a new updated package, which is available to all.

PGP does not manage the key information, for example by checking the validity of the information or by preventing name duplications.

If a key is compromised, it is practically impossible to remove it from the server; PGP and RSA only keep a second list (the black list) of disabled or canceled keys, and users are advised to check that list to ensure key reliability. A compromised key cannot be reliably removed since, although that key can be physically deleted, the PGP server cannot prevent a package containing the same key from being reloaded by anyone; since an unknown number of users may hold copies of the signed package with that key, any one of them may reload the key into the PGP server.

This has the disadvantage that the second list (the black list) will be under severe overload stress, since any user receiving a package near the expiry date will presumably want to check it for validity; any other user desiring to communicate sensitive information will probably desire to check the key as well.

In our center, however, there is no second, "black" list but only a reliable list of certificates. The owner of a key may update it at any time, so a compromised key will not have severe repercussions- the user just changes it and receives an updated certificate with a new date embedded therein. The user presents that certificate to other parties to establish secure communication therewith. There is no need to keep lists of certificates or keys, since an updated key is presented by the other party with each new communication transaction. All is needed is an updated public key of the center supporting these transactions, to use in checking the presented certificates.

The other party to a communication transaction can always chose to check the key by accessing the center; the center issues updated certificates to anyone, attesting to the validity of the key for any desired user. There is no need to read a black list and therefore there is less load on the center.

The user, while establishing an account with the center, is given a "cancellation code", that is an identification code for key changes or cancellation purposes. Only change request thus authorized will be honored, to prevent the files from unauthorized changes.

If the private key of the RSA or other similar centers is compromised, this results in a "catastrophe" according to their explanation, since anyone can impersonate other users. This is a "total loss" situation. All existing keys and identification packages must be updated, each with its multiple approvals.

In our invention center, however, if the private key of the center is compromised, then a user should not accept an old certificate which may be affected by that key, but should ask for a new certificate or access the center for an updated, reliable certificate. Thus it is easier to recover from an occurrence of a compromised key of the center. Even if someone succeeds in finding the private key of the center, they still cannot impersonate the center, that is they cannot answer phone calls placed with the center. Any user suspecting a certificate presented to him has the option of calling the center to get a reliable, updated version of the certificate which cannot be tampered with. Thus, the physical phone connections of the center provide a still higher level of security protection in our invention.

The key distribution center in our invention functions like a phone information service, that is service 1-411 in the U.S., or 144 in Israel. It provides an updated certificate including the user identification and his public key to anyone, that is to any anonymous caller. Unlike the phone information service, however, the key distribution center in the present invention allows for frequent changes in the certificates issued.

In PGP, people are encouraged to keep local lists with keys for desired correspondents; this is especially important since keys are to be authorized by third parties; in RSA, certificates are issued for a long period of use. No such local keys lists are needed in the center in our invention, since the center holds the most recently updated key for each user, available to all; each user can hold a certificate of/for himself, with a recent authorization, to be presented to another party as required.

Another user of public key encryption is the PC Fax program package offered by Microsoft under Windows. This package facilitates the transmission of FAX messages which may be optionally encrypted. The FAX may be encrypted using a password or a digital key, which are conceptually the same. It uses a public key and a private key, under the "Fax Security/Advance Security" menu.

Again, they face the same problem of reliable key dissemination. Microsoft advises to exchange diskettes containing the key, clearly a difficult to use method.

A public key can be exchanged by communication means, and again there is the problem of identifying the other party-how one is to know that the answering party is truly the person it claims to be. This lack of a practical solution attests to the need which is filled with the present invention, of reliable key management and dissemination using reliable certificates including the public key and information for each user. In the method described in the present invention, the problem faced by Microsoft is easily solved: Each party sends its certificate to the other, and a secure link is immediately established. The certificate exchange method can be easily integrated in the fax communication program provided by Microsoft. This is an indication of the nonobviousness of the present invention, which addresses a hitherto unsolved problem.

Another use of the present method of key dissemination is to access remote databases or other information services on an irregular basis. With the proliferation of remote information services, it is practically impossible for any single user to subscribe to all of them. The subscription is necessary for the service provider to charge the user for the service as provided. It may be difficult or not economic for the information providers as well to handle a multitude of users, each using the database to only a small extent. Usually the information is accessed from a remote site through data communication links like the Internet.

In this application, the key management center acts as a user authorization party, by assigning to interested users a certificate which enables them to access a multitude of databases.

The method includes the following steps:

1g. The key management center signs agreements with a multitude of information providers, for the providers to accept irregular users which are authorized by the center as attested by presenting a digital certificate issued by the center, and to charge the center for the services provided;

2g. the center accepts and authorizes users to use the information services it has business relations with, including the steps of:

A. a user accesses the center from a remote site;

B. (optional) the user downloads from the center a software package to generate an encryption key pair and maybe a communication routine for subsequent communication with the center;

C. the user identifies himself/herself, for example by providing a name or pseudonym, and a credit card number, which may be encrypted using the center's public key or the key pair generated in (B) above;

D. the center checks the validity of the credit card; and

E. if the credit card is valid, then the user is issued a certificate which includes the information supplied by the user and additional optional information like the issue date and center details, all encrypted with the private key of the center; and 3g. the user thus authorized accesses the desired remote services, presents the certificate and is accepted as a user of that service.

Other embodiments of the abovedetailed method are possible, for example in (C) above the user may provide not the explicit credit card number but an encrypted package containing that number, for example encrypted with the public key of the credit card issuer; then in (D) the center sends that package to the card issuer which opens it using its private key and issues a transaction authorization to the center, while the center has no copy of the credit card itself. This method may prevent the card number being misused or getting into the wrong hands.

The software package sent to a user in step 2g(B) above may be itself encrypted with the private key of the center, to protect from tampering with that software which is an important constituent of the abovedetailed method, since the encryption key has to be generated by a secure method.

The service provider may charge directly the user for the service as provided, using the credit card number if included in the certificate, or it may charge the center which issued the certificate, which in turn may charge the end users.

Another application of the method detailed above is caller identification, with the subsequent communication being either encrypted or not. Caller identification is implemented by the exchange of certificates as detailed above.

Caller identification may be beneficial in a wide variety of applications, for example telephone, fax, cellular/wireless phone, computer communications, remote control/base station, access control. Present caller identification methods may identify a phone number belonging to a firm or organization, but there is no identification of a specific user or telephone within that organization. This problem is solved with the present invention.

The user's encryption machine may include display means for displaying the other user identification information which is included in the received certificate. This may include the real user's name or a nickname or a pseudonym, together with a company name and that person's position. This provides for easy and reliable identification of the parties involved in a remote communication transaction.

Since the certificate includes the issue date, its validity may be limited as desired, according to application and circumstances. For example, access control to a parking lot may be permitted with a monthly permit in one season, whereas a weekly permit may be required in another season. These flexible time limits can be easily enforced with present computer technology implementing the method detailed in the present invention.

The certificates issued according to the present invention may optionally include a list of authorizations or actions permitted for that user to do, or databases to access, or permitted operations in those databases. The authorizations may be based on the user track record or experience or credit rating or security/identification level. This offers the benefit that each user is given access to facilities or is allowed to perform operations without the need to recheck their authorization each time they access the system.

What is claimed is:

1. A method for safe distribution of encryption keys, to make possible to establish a secure link between parties which are at separate locations and which parties had no previous secure communications therebetween, wherein a first user desiring to establish a secure communication session with a second user performs steps comprising:

(A) generating an encryption key pair, comprising a secret private key and a known public key;
    (B) storing the private key in digital storage means at the first user's facility, to be used for received messages decryption;
    (C) sending a digital message to a key distribution center, the message including identification data for the first user and the public encryption key;
    (D) receiving a digital certificate from the center and storing it in the digital memory, wherein the certificate includes the identification data, the public key and time-related information indicating the date of preparation of the certificate, all encrypted with the secret private key of the center;
    (E) using the certificate for establishing a secure link with the second user, by sending the certificate to the second user it is desired to establish secure communications therewith;
    (F) occasionally and anonymously interrogating the center for the certificate pertaining to the first user, to ensure the information in the center was not tampered with; and wherein the second user, addressed by the first user desiring to establish a secure communication session performs steps comprising:
        (A') receiving a message from the first user, the message including a certificate with information pertaining to the first user and including identification data for the first user, the public key for the first user and information indicating the date of preparation of the certificate, all encrypted with the secret private key of the center;
        (B') decrypting the message using the public, known key of the center, to reveal the identification, the public key and the date for the first user;
        (C') making a decision of either to trust the certificate or to verify it, where in the former case go to step (K') below and in the latter case go to step (D') below;
        (D') inquiring the key distribution center about the first user, receiving the answer from the center including the correct up-to-date certificate pertaining to the first user;
        (E') decrypting the answer using the public, known key of the center;
        (F') if the key and user identification in the answer are identical to those in the certificate decrypted in step (B') above, then verification is positive, go to step (G') below, else end;
        (G') generating an encryption key pair, comprising a secret private key and a known public key;
        (H') storing the private key in digital storage means at the second user's facility, to be used for the decryption of received messages;
        (I') sending a digital message to a key distribution center, the message including identification data for the second user and the public encryption key;
        (J') receiving a digital certificate from the center and storing it in the digital memory, wherein the certificate includes the identification data, the public key and time-related information indicating the date of preparation of the certificate, all encrypted with the secret private key of the center; and
        (K') acknowledge to the first user the reception of a valid certificate, to indicate that the second user is ready to accept an encrypted message from the first user.

2. The method for safe distribution of encryption keys according to claim 1, wherein the second user further performs, during or after step (K') of acknowledging the first user, the step of sending the certificate for the second user to the first user.

3. The method for safe distribution of encryption keys according to claim 1, wherein the certificate obtained in step (D) is subsequently presented to other users with whom the first user desires to establish a secure link, and wherein each of the other users performs a method as detailed in steps (A') to (K').

4. The method for safe distribution of encryption keys according to claim 1, wherein the key distribution center is connected to one or more additional distribution center units having communication links therebetween for exchanging information, so that each one of the first user and the second user can connect to either one of the centers to perform each of the steps (C), (D), (F) and/or (D').

5. The method for safe distribution of encryption keys according to claim 1, wherein in step (D') the center will send unconditionally the certificate for any user, without asking the identification of the inquirer.

6. The method for safe distribution of encryption keys according to claim 1, wherein the links established between the first user, the second user and/or the center are temporary links which are set up for the designated function and disconnected after the completion of the communication session.

7. The method for safe distribution of encryption keys according to claim 1, wherein the performance of steps (A) to (D) is initiated periodically with certain users, to update their key pair.

* * * * *